United States Patent [19]
Bosley et al.

[11] Patent Number: 5,791,868
[45] Date of Patent: Aug. 11, 1998

[54] THRUST LOAD COMPENSATING SYSTEM FOR A COMPLIANT FOIL HYDRODYNAMIC FLUID FILM THRUST BEARING

[75] Inventors: Robert W. Bosley, Cerritos; Ronald F. Miller, Marina del Rey, both of Calif.

[73] Assignee: Capstone Turbine Corporation, Tarzana, Calif.

[21] Appl. No.: 663,732

[22] Filed: Jun. 14, 1996

[51] Int. Cl.$^6$ ..................................... F01D 3/00
[52] U.S. Cl. .................... 415/104; 415/107; 417/365; 60/39.07
[58] Field of Search .................... 415/96, 104, 107, 415/105; 417/365; 60/39.07, 39.83

[56] References Cited

U.S. PATENT DOCUMENTS

| | | |
|---|---|---|
| 2,748,714 | 6/1956 | Henry . |
| 3,225,698 | 12/1965 | Spisiak ........................... 417/365 |
| 3,500,961 | 3/1970 | Eberhardt et al. . |
| 4,167,295 | 9/1979 | Glaser . |
| 4,171,928 | 10/1979 | Emerson . |
| 4,234,293 | 11/1980 | Lightle ........................... 417/365 |
| 4,309,144 | 1/1982 | Eggmann et al. . |
| 4,472,107 | 9/1984 | Chang et al. ................... 415/104 |
| 4,730,977 | 3/1988 | Haaser . |
| 4,969,797 | 11/1990 | Takara et al. . |
| 4,993,917 | 2/1991 | Kulle et al. . |
| 5,132,226 | 7/1992 | Miura et al. ................... 415/106 |
| 5,141,389 | 8/1992 | Bear et al. . |
| 5,312,225 | 5/1994 | Lorenzen . |

*Primary Examiner*—Thomas E. Denion
*Attorney, Agent, or Firm*—Albert J. Miller

[57] ABSTRACT

A thrust load compensating system for a compliant foil hydrodynamic fluid film thrust bearing is disclosed. The system includes an end cap over the free end of a rotary machine shaft, a compliant foil hydrodynamic fluid film journal bearing located at the free end of the shaft, and a source of air whose pressure varies with the square of turbomachine speed. The compliant foil hydrodynamic fluid film journal bearing located at the free end of the shaft serves as a non-contacting rotary shaft seal and, together with the end cap and free end of the shaft forms a thrust piston chamber. The thrust load compensating system of the present invention can be utilized in high speed rotary machines that have a compressor wheel and a turbine wheel that generate large axial aerodynamic forces that increase with speed.

38 Claims, 5 Drawing Sheets

5,791,868

1

THRUST LOAD COMPENSATING SYSTEM FOR A COMPLIANT FOIL HYDRODYNAMIC FLUID FILM THRUST BEARING

TECHNICAL FIELD

This invention relates to the general field of compliant foil hydrodynamic fluid film thrust bearings and more particularly to an improved system to compensate for the large net thrust loads applied to the bearing during high speed operation of a turbomachine.

BACKGROUND OF THE INVENTION

Compliant foil hydrodynamic fluid film thrust bearings are currently being utilized in a wide variety of high speed rotor applications. Thrust bearings of this type generally include a two-sided or bilateral thrust disk rotating element, non-rotating compliant fluid foil members that axially enclose the rotating element, and non-rotating compliant spring foil members that axially enclose the fluid foil members. A non-rotating thrust plate element and a non-rotating housing element axially enclose and provide attachments for the non-rotating foil members. The space between the rotating element and the thrust plate element on one side of the thrust bearing and the space between the rotating element and the thrust surface of the housing element on the other side of the thrust bearing are filled with fluid (usually air) which envelops the foil members.

The rotary motion of the bilateral thrust disk rotating element applies viscous drag forces to this fluid and induces a circumferential flow of the fluid between the smooth surface of the rotating element and the fluid foil member. The space between the rotating element and the fluid foil member is subdivided into a plurality of fluid-dynamic wedge channels each with its own fluid foil pad. The hydrodynamic converging ramps of the fluid foil pads (converging relative to the fluid's circumferential flow) and the smooth surface of the rotating element form the two primary surfaces of the converging wedge channels. The diverging ramps of the fluid foil pads and the smooth surface of a rotating element form the primary surfaces of the diverging wedge channels. The fluid flowing circumferentially along a converging wedge channel experiences steadily decreasing flow area, increasing circumferential flow velocity, and increasing static fluid pressure. If the rotating element moves axially toward the non-rotating fluid foil member, the convergence angle of the wedge channel increases causing the fluid pressure rise along the channel to increase. If the rotating element moves axially away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foil members causes coulomb damping of any axial or overturning motion of the rotating element of the bearing.

Owing to preload spring forces or gravity forces, the bilateral thrust disk rotating element of the thrust bearing is typically in physical contact with the fluid foil members of the bearing at rest and at low rotational speeds. This physical contact can result in bearing wear. It is only when the rotor speed is above what is termed the lift-off/touch-down speed that the fluid dynamic forces generated in the wedge channels assure a running gap between the rotating and non-rotating elements.

At turbomachine speeds slightly above the bearing's lift-off/touch down speed, the thrust bearing load capacity increases nearly with the square of turbomachine speed. But with further increases in turbomachine speed, the load capacity of the thrust bearing becomes an ever lower exponential function of turbomachine speed. At very high speeds, the thrust load capacity may not increase at all with speed.

The net axial forces generated aerodynamically by the compressor wheel and turbine wheel of a typical turbomachine increases with the square of speed at all turbomachine speeds. Thus, typically, compliant foil hydrodynamic fluid film thrust bearings can easily support turbomachine thrust loads at low speeds but may not be able to do so at high speeds.

Many turbomachines include a turbine wheel and a compressor wheel at opposite ends of a common shaft or bearing rotor positioned with their back planes opposed. The compressor end of the bearing rotor would normally include a radially extending rotor flange or thrust disk which would extend into a recess in the compressor end of the center housing adjacent to the housing's thrust surface. As described above, a bearing thrust plate would be disposed on the opposite side of the rotating thrust disk.

When the turbomachine is operated at high speed, unequal pressures and axial forces are developed at the turbine and compressor ends of the rotor that tend to force the rotating thrust disk towards the compressor end of the turbomachine. This occurs when the compressor wheel gains speed and the pressure behind the compressor wheel increases from atmospheric pressure to a portion of the total discharge pressure from the compressor.

For example, if the turbomachine has a compressor discharge pressure on the order of 29 psig, the pressure behind the back plane of the compressor wheel would be on the order of 8 psig. If for example, the area of the back plane was 9.5 square inches, a 76 pound axial force towards the compressor end of the turbomachine would be generated and applied to the rotor.

When this is compared to the opposing turbine back plane (delta) exhaust pressure on the order of 5 psig, with a net back plane area of 6.6 square inches, generating an axial force of 33 pounds towards the turbine end of the turbomachine, it is easy to see that the thrust load on the bearings will be biased toward the compressor end of the turbomachine.

This will result in an unequal thrust loading of the thrust bearing with the compressor side thrust bearing fluid foil pads more heavily loaded than the turbine side thrust bearing fluid foil pads. In some cases, particularly in the most advanced thrust bearings where the thrust bearing fluid foil pads are essentially unloaded at rest, that is, not preloaded by the spring foil members, the compressor side thrust bearing fluid foil pads will be the only side loaded at speed. In this instance, the turbine side thrust bearing fluid foil pads would not be loaded at speed. With unequal bilateral thrust loading, or loading of only one side of the thrust bearing, unequal bearing fluid foil pad wear, or reduced fluid foil pad life or fluid foil pad failure can result. Existing turbomachines do not include any means to compensate for this net thrust loading.

SUMMARY OF THE INVENTION

In the present invention, the unequal loading on opposite sides of a two sided or bilateral compliant foil hydrodynamic fluid film thrust bearing, which is the result of net aerodynamic thrust loading, is compensated for with a system utilizing bleed air from the compressor. The turbine and compressor wheels, which are mounted on a common bearing rotor, are rotatably supported by a compliant foil hydrodynamic fluid film journal bearing and axially positioned by a compliant foil hydrodynamic fluid film thrust bearing. A fixed end cap is positioned over the free end of a rotary machine shaft, which is coupled to the common bearing rotor, and rotatably supported by compliant foil hydrodynamic fluid film journal bearings. Bleed air is provided from the compressor to the interior of the fixed end cap. The compliant foil hydrodynamic fluid film journal bearing at the free end of the rotary machine shaft, serves as a non-contact rotary shaft seal and, together with the end cap and the end of the rotary machine shaft forms a thrust piston chamber. As rotational speed increases, the pressure of the bleed air increases to axially bias the position of the rotary machine shaft and the common bearing rotor so as to compensate for the unequal loading on opposite sides of the bilateral compliant foil hydrodynamic fluid film thrust bearing.

The thrust load compensating system can be utilized in high speed rotary machines that have compressor wheels and turbine wheels which generate large axial aerodynamic forces which can exceed the load carrying capacity of the bilateral compliant foil hydrodynamic fluid film thrust bearing supporting the turbomachine rotors.

The compressor air can be bled at a number of suitable compressor locations, depending upon the pressure required. Also, the delivery of the bleed air to the interior of the fixed end cap can be either around or through the coupled rotary machine. In addition, an orifice or a valve such as a pressure ratio control valve or an automatic tracking valve can be provided to precisely control the amount and pressure of the bleed air delivered to the interior of the fixed end cap.

It is therefore a principal object of the present invention to provide thrust load compensation for a compliant foil hydrodynamic fluid film thrust bearing so as to reduce the thrust loads applied to that bearing by the axial aerodynamic forces generated by a turbomachine's compressor and turbine.

It is another object of the present invention to utilize the free end of the turbomachine shaft as a movable thrust piston.

It is another object of the present invention to utilize an end cap enclosing the free end of the turbomachine shaft as the end of a non-rotating thrust cylinder.

It is another object of the present invention to utilize the compliant foil hydrodynamic fluid film journal bearing located at the free end of the shaft as the bore of a non-rotating thrust cylinder and as a non-contacting piston ring seal.

It is another object of the present invention to utilize the shaft, end cap and the journal bearing/seal together to form a pressure chamber with a movable thrust piston.

It is another object of the present invention to provide the pressure chamber with air having a gauge pressure (pressure above ambient) that varies with the square of turbomachine speed.

It is another object of the present invention to apply an axial force to the piston/shaft that varies with the square of the turbomachine speed.

It is another object of the present invention to apply an axial force to the piston/shaft that is equal to the gauge pressure in the pressure chamber times the cross-sectional area of the piston/shaft where it passes through the compliant foil hydrodynamic fluid film journal bearing.

It is another object of the present invention to utilize compressor bleed air, which varies with the square of the turbomachine speed, as the air source for the pressure chamber.

It is another object of the present invention to control the ratio of piston/shaft force to the square of the turbomachine speed by the selection of the radius of the bleed air tap point along the compressor airflow path (along the scroll surface, at the tip of compressor wheel, along the diffuser flow path, or at the diffuser discharge).

It is another object of the present invention to control the ratio of piston/shaft force to the square of the turbomachine speed by utilizing an automatic tracking valve to set the gauge pressure in the pressure chamber at a fixed ratio (determined by relative valve diaphragm/piston areas) to the compressor discharge gauge pressure.

It is another object of the present invention to control the ratio of piston/shaft force to the square of the turbomachine speed by utilizing an orifice in the line connecting the compressor discharge to the pressure chamber in order to reduce the chamber pressure to the appropriate level.

It is another object of the present invention to set the axial forces generated by the pressure chamber and applied to the piston/shaft and therefor applied to the compliant foil hydrodynamic fluid film thrust bearing at all shaft speeds to a value slightly less than the net aerodynamic forces applied to the bearing but in the opposite direction.

It is another object of the present invention to minimize the bleed air flow required to generate the thrust compensating forces.

It is another object of the present invention to reduce the risk of bearing failure by reducing the thrust loads that must be supported by the thrust bearing.

It is another object of the present invention to reduce bearing drag torque by reducing the thrust loads that must be supported by the thrust bearing.

It is another object of the present invention to reduce bearing power consumption by reducing the thrust loads that must be supported by the thrust bearing.

It is another object of the present invention to reduce bearing heating by reducing the thrust loads that must be supported by the thrust bearing.

BRIEF DESCRIPTION OF THE DRAWINGS

Figure 1:
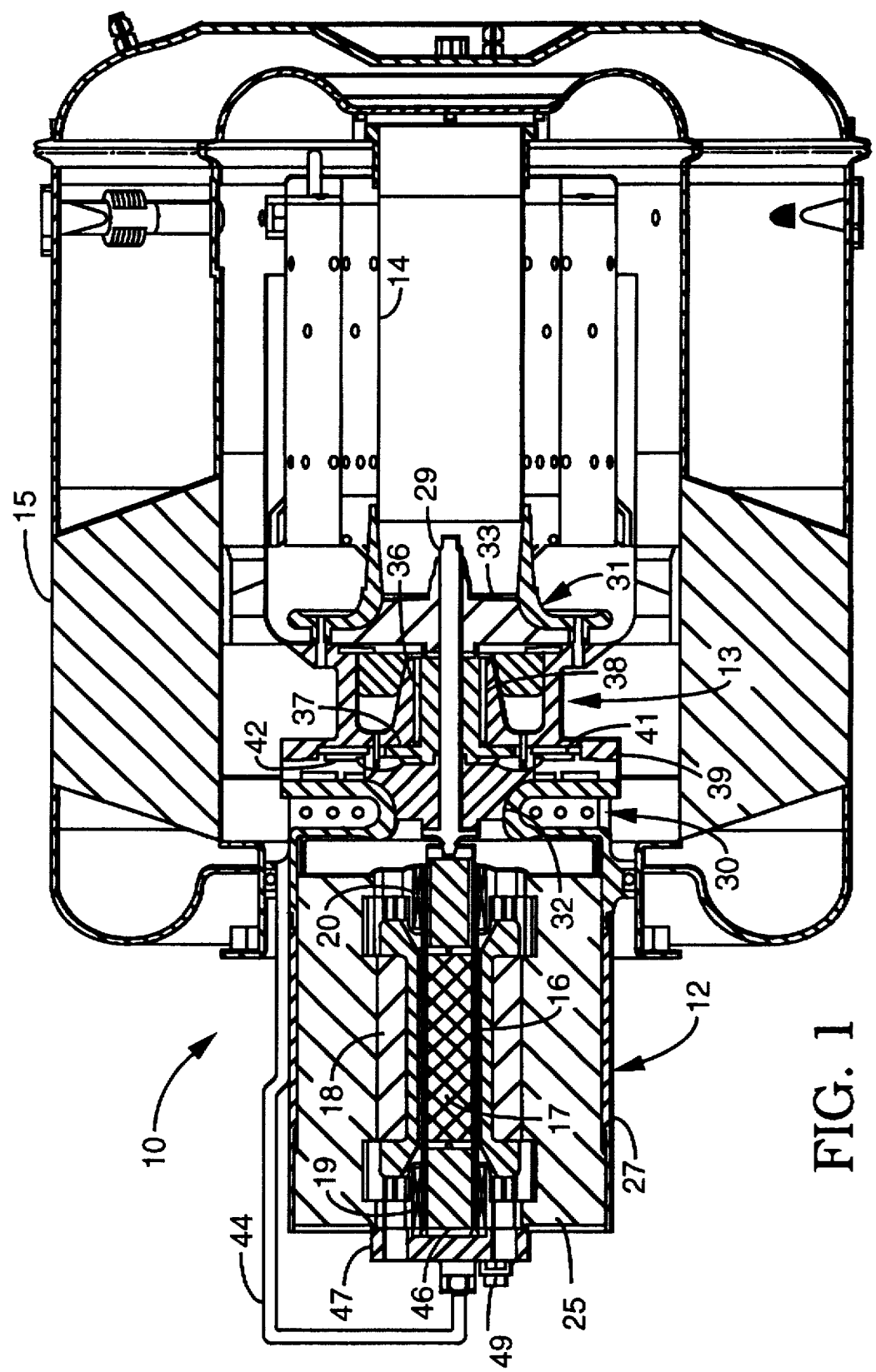
Figure 2:
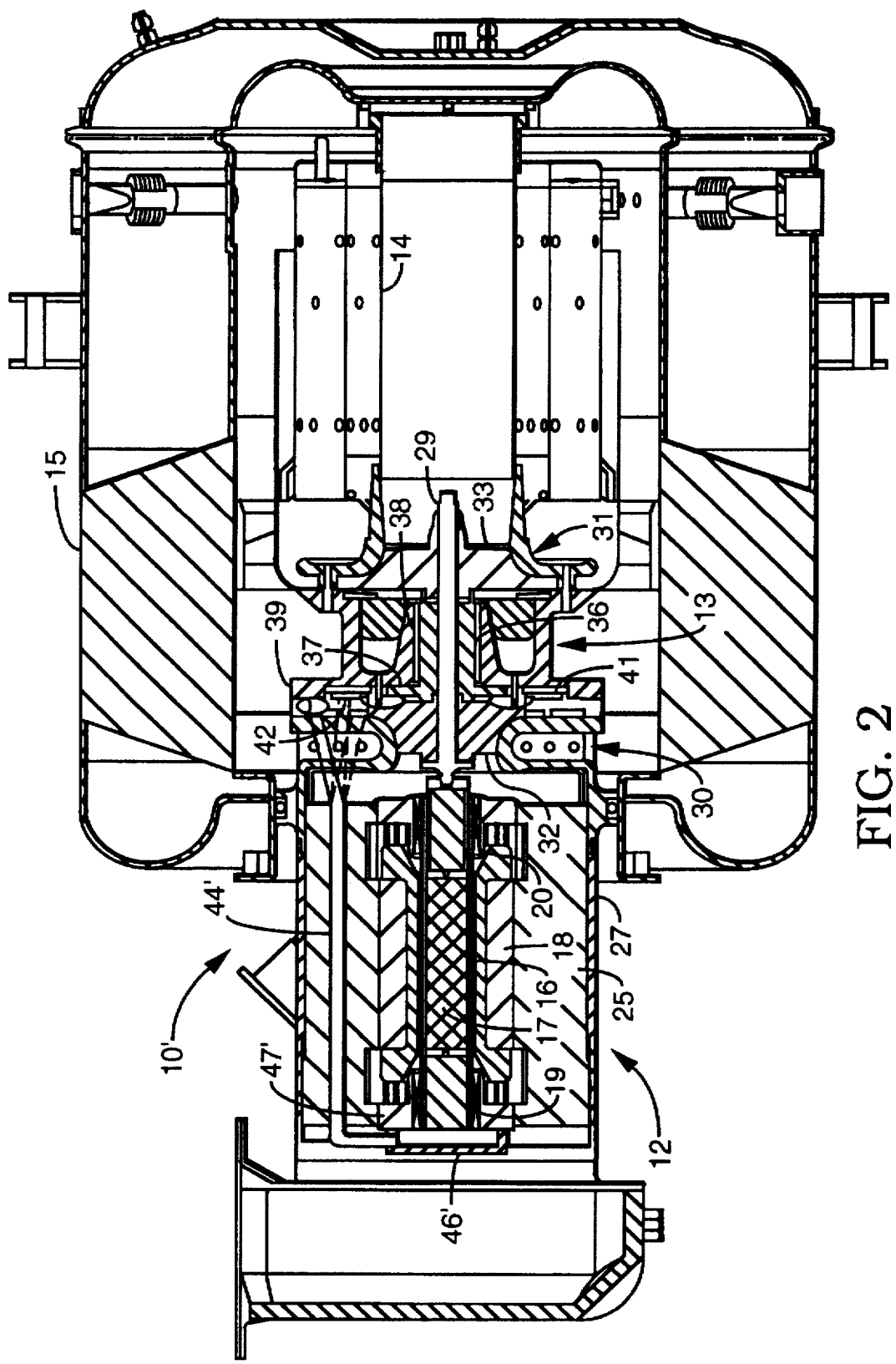
Figure 3:
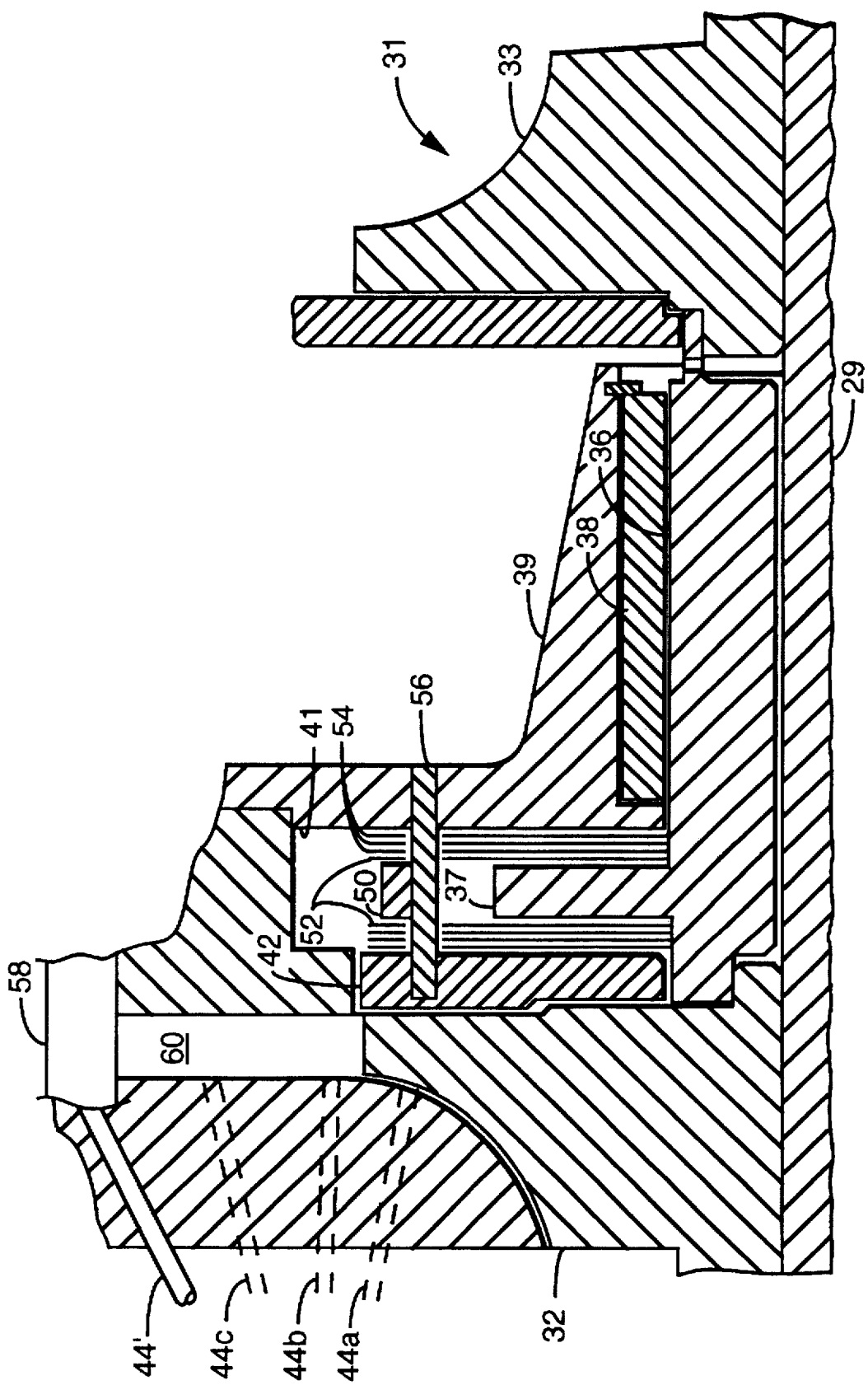
Figure 4:
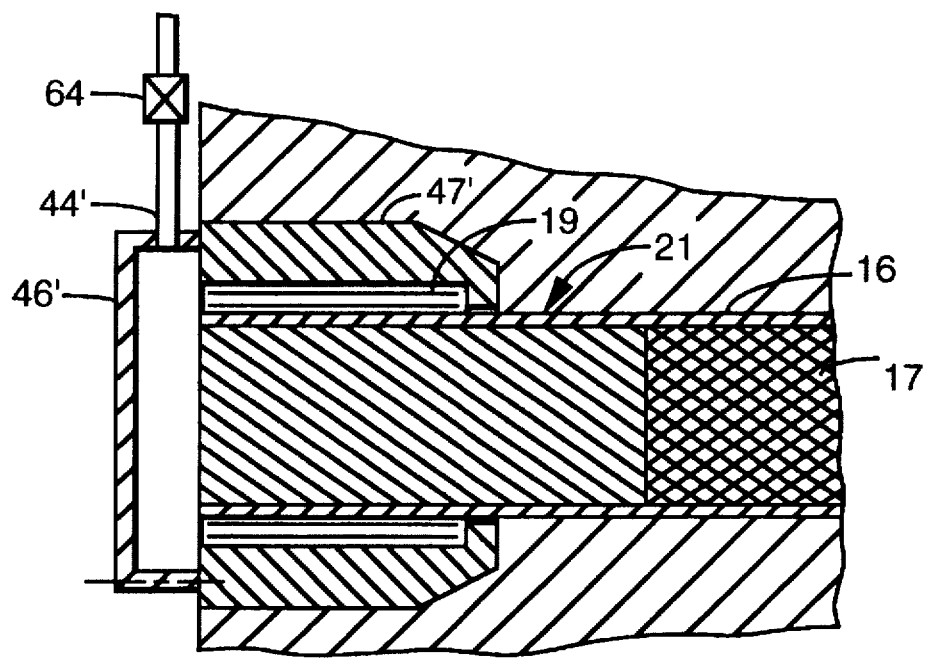
Figure 5:
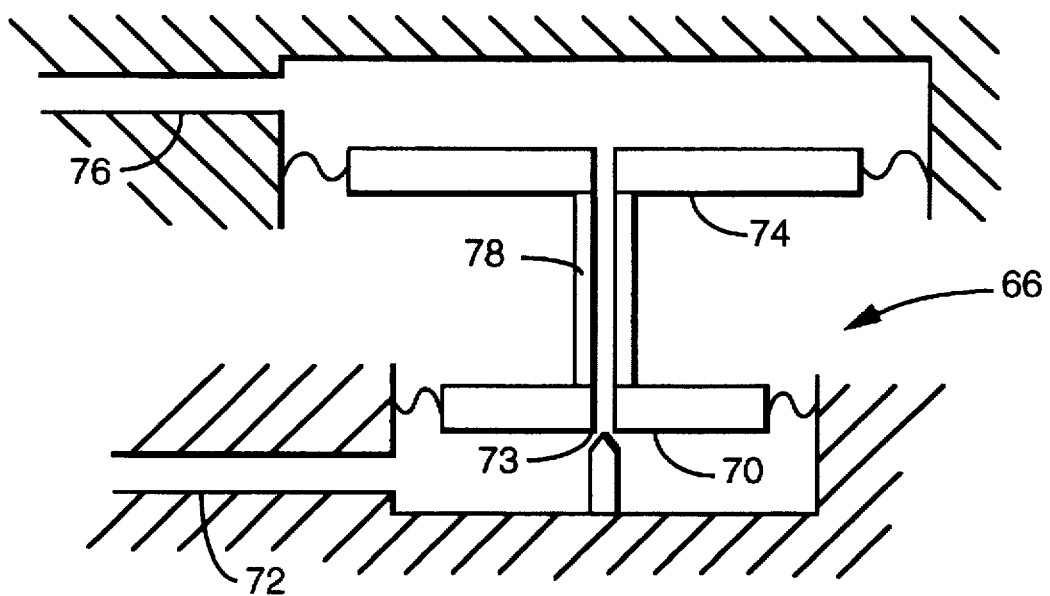
Figure 6:
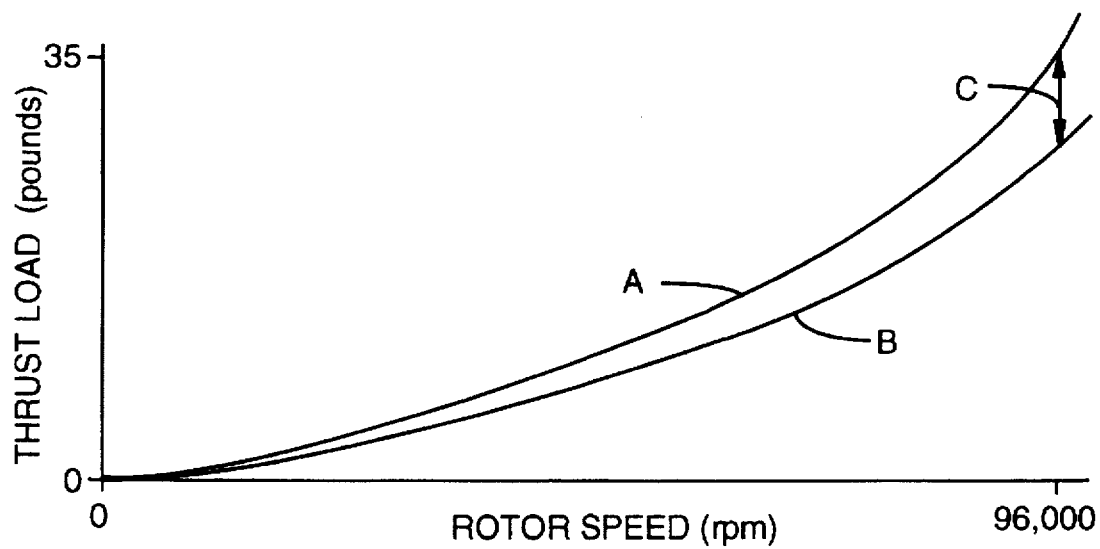
Figure 7:
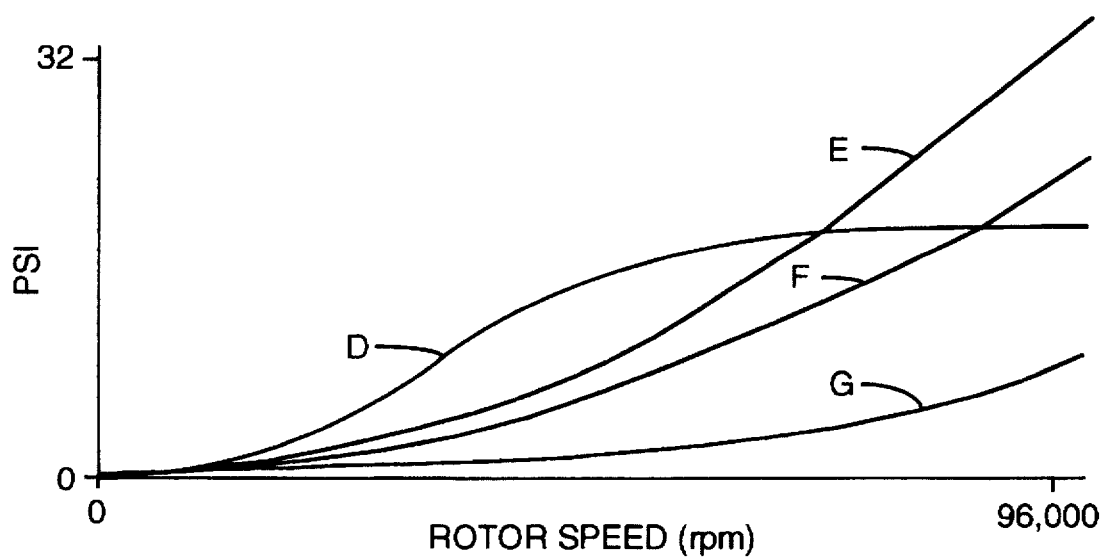

Having thus described the present invention in general terms, reference will now be made to the accompanying drawings in which:

FIG. 1 is a sectional view of a turbomachine having the thrust load compensating system of the present invention with a compliant foil hydrodynamic fluid film thrust bearing;

FIG. 2 is a sectional view of an alternate turbomachine having the thrust load compensating system of the present invention with a compliant foil hydrodynamic fluid film thrust bearing;

FIG. 3 is an enlarged sectional view of a portion of the turbomachine of FIG. 2 illustrating the power head and including the compliant foil hydrodynamic fluid film thrust bearing;

FIG. 4 is an enlarged sectional view of a portion of the turbomachine of FIG. 2 illustrating the fixed end cap over the end of the turbomachine shaft;

FIG. 5 is a schematic illustration of an active flow metering control valve or automatic tracking valve for the thrust load compensating system of the present invention;

FIG. 6 is a graph illustrating thrust load applied to the thrust bearing in pounds vs. rotor speed in rpm; and FIG. 7 is a graph illustrating pressure in psi vs. rotor speed in rpm.

DETAILED DESCRIPTION OF THE PREFERRED EMBODIMENTS

A permanent magnet turbogenerator 10 is illustrated in FIG. 1 as an example of a turbogenerator utilizing the hydrostatic augmentation system for a compliant foil hydrodynamic fluid film thrust bearing of the present invention. The permanent magnet turbogenerator 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet 17 disposed therein, rotatably supported within a permanent magnet stator 18 by a pair of spaced journal bearings 19, 20. Radial permanent magnet stator cooling fins 25 are enclosed in an outer cylindrical sleeve 27 to form an annular air flow passage which cools the permanent magnet stator 18 and thereby preheats the air passing through on its way to the power head 13.

The power head 13 of the permanent magnet turbogenerator 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing 38 within the center bearing housing 39 while the bearing rotor thrust disk 37 at the compressor end of the bearing rotor 36 is rotatably supported by a bilateral thrust bearing. The bearing rotor thrust disk 37 is adjacent the thrust face 41 at the compressor end of the center bearing housing 39 while a bearing thrust plate 42 is disposed on the opposite side of the bearing rotor thrust disk 37 relative to the center housing thrust face 41.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine exhaust gases are then passed through the recuperator 15 before being discharged from the turbogenerator 10.

A conduit 44 receives bleed air from the compressor 30 and extends along the exterior of the cylindrical sleeve 27 of the permanent magnet generator 12 to the end of the permanent magnet rotor 16. This conduit 44 delivers bleed air to the interior of the fixed end cap 46 which covers the end of the permanent magnet sleeve 16 and journal bearing 19. The bearing retainer 47 is bolted to the permanent magnet generator 12 by a plurality of bolts 49.

An alternate permanent magnet turbogenerator 10' is illustrated in FIG. 2. Whereas the conduit 44 in the turbogenerator 10 of FIG. 1 proceeded along the outside of the permanent magnet generator sleeve 27, the conduit 44' of the permanent magnet turbogenerator 10' of FIG. 2 proceeds along the permanent magnet stator cooling fins 25 disposed between the permanent magnet generator sleeve 27 and the permanent magnet stator 18.

As shown in FIG. 4, the bleed air from conduit 44' in fixed end cap 46' act against the end of the permanent magnet shaft 21 formed from the permanent magnet sleeve 16 and permanent magnet 17. Since the permanent magnet sleeve 16 is longer than the permanent magnet 17, the ends of the permanent magnet shaft 21 may be hollow as depicted in FIG. 1, or may be solid or filled with a material such as epoxy as shown in FIGS. 2 and 4. In either case, the pressurized bleed air acts against the end of the permanent magnet shaft 21.

The permanent magnet shaft 21 is rotatably supported by a pair of compliant foil hydrodynamic fluid film journal bearings 19, 20. The compliant foil hydrodynamic fluid film journal bearing 19 is shown positioned within the bearing retainer 47'. While there will be some minimal leakage of bleed air through journal bearings of this type, these bearings will effectively permit the pressure of the bleed air to act upon the end of the permanent magnet shaft 21 such that the shaft 21 will behave much like a piston. Since rolling contact bearings such as ball or roller bearings would not provide sufficient sealing against the bleed air pressure, the journal bearings should be of the compliant foil hydrodynamic fluid film type of bearing, an example of which is described in detail in U.S. Pat. No. 5,427,455 issued Jun. 27, 1995, to Robert W. Bosley, entitled "Compliant Foil Hydrodynamic Fluid Film Radial Bearing" and is herein incorporated by reference.

The compliant foil hydrodynamic fluid film thrust bearing is best illustrated in FIG. 3. A thrust bearing spacer 50 is positioned radially outward from the bearing rotor thrust disk 37 of the bearing rotor 36 and is positioned radially by a plurality of circumferentially spaced pins 56 which are fixed in holes in the thrust face 41 of the center bearing housing 39 and extend into holes in the thrust bearing plate 42. A thrust bearing fluid foil element 52 and a plurality (shown as three) of thrust bearing spring foil elements 54 are disposed on either side of the bearing rotor thrust disk 37 and thrust bearing spacer 50. On one side, the fluid foil element 52 and spring foil elements 54 are positioned in the thrust face 41 of the center bearing housing 39 and on the other side they are adjacent to the thrust bearing plate 42. The fluid foil element 52 and spring foil elements 54 are held in position radially and circumferentially by the pins 56 each of which extend from the center bearing housing 39, through holes in the spring foil elements 54, through a hole in the fluid foil element 52, traverse the bore of the thrust bearing spacer 56, through a hole in the opposite side fluid foil element 52, the holes in the opposite side spring foil elements 54 and into a hole in the thrust bearing plate 42. It should be recognized that the space between the thrust bearing plate 42 and the bearing rotor thrust disk 37 is shown as enlarged as is the space between the bearing rotor thrust disk 37 and the thrust face 41 of the center bearing housing 39.

A detailed example of a compliant foil hydrodynamic fluid film thrust bearing can be found in U.S. patent application Ser. No. 08/363,540 filed Dec. 23, 1994 by Robert W. Bosley, entitled "Compliant Foil Hydrodynamic Fluid Film Thrust Bearing" (issuing as U.S. Pat. No. 5,529,398 on Jun. 25, 1996) and is herein incorporated by reference.

There are a number of compressor locations where bleed air can be extracted for the conduit 44'. The conduit 44' is shown in FIG. 3 as taking bleed air from the compressor plenum 58. Alternate bleed air locations are also shown in FIG. 3 which illustrates the diffuser channel 60. Conduit 44a shows extraction of bleed air from the compressor scroll slightly below the tip of the compressor wheel 32, while conduits 44b and 44c illustrate extraction at the transition from the compressor scroll to the diffuser channel 60 and at the mid-point of the diffuser channel 60, respectively. While the diffuser is illustrated and described as straight walled, it should be understood that other types of diffusers can be utilized, such as a pipe diffuser or a vaned diffuser.

The location where the bleed air is taken will determine the pressure of the bleed air supplied by the conduit 44' to the fixed end cap 46'. The available pressure in the conduit would generally be as follows: 44'—29 psi, 44c—24 psi, 44b—19 psi, and 44a—17 psi. The pressure selected or needed at the fixed end cap 46' will be determined by the net thrust load developed aerodynamically by the compressor and the turbine and applied to the bilateral thrust bearing.

The thrust load compensating system of the present invention can be totally passive. When the permanent magnet generator 10 is at rest, the compressor 30 does not produce any pressurized air, therefore no compressed air is available. Of course, none is needed since there are no unbalanced thrust forces applied to the bilateral thrust bearing when the turbogenerator is at rest.

Regardless of where the bleed air is extracted from the compressor 30, its pressure will increase with the square of rotational speed. Since the unbalance of the thrust forces on the bilateral thrust bearing also increases with the square of rotational speed, the greater the unbalance, the greater the compensating force from the bleed air. In other words, as the net thrust force on the bilateral thrust bearing tends to force the thrust bearing and shaft 21 to the left, the build up of bleed air pressure in the fixed end cap 46' will counter with an increasing force tending to move the shaft 21 to the right.

If required, an orifice 64 may be included in conduit 44' to more precisely effectuate control of the bleed air pressure in the fixed end cap 46'. If even more precise control is needed, active flow metering can be accomplished with the pressure ratio control valve or automatic tracking valve 66 shown in FIG. 5. The valve 66 can be placed in conduit 44' to establish equilibrium at a selected pressure ratio between the pressure in the fixed end cap 46' (piston pressure) and the compressor discharge pressure.

The pressure ratio control valve 66 includes a first diaphragm 70 subjected to compressor discharge pressure through port 72 and a second somewhat larger diaphragm 74 subjected to piston pressure through port 76. The space between the diaphragms 70, 74 is exposed to atmospheric pressure.

Compressor discharge air (typically obtained from the diffuser inlet or the diffuser discharge) enters the valve at port 72. This air applies a force to disk 70 equal to the area of this disk times the pressure difference between port 72 air and the ambient air. When the valve is operating normally (the variable orifice 73 is partially open), the force on disk 70 must equal the force on disk 74. The force on disk 74 is equal to the area of this disk times the pressure difference between port 76 and ambient air. Because of this relationship the gauge pressure at port 76 is always proportional to the gauge pressure at port 72 and the ratio of the pressure at port 76 to the pressure at port 72 is the same as the ratio of the area of disk 70 to the area of disk 74. It should be noted that flow out of port 76 is required for the variable orifice 73 to be partially open during normal operation of this valve. The output flow from port 76 is connected by tubing to the end cap 46. The pressure chamber of the thrust load compensator will produce the desired force (which is proportional to the square of speed) at all speeds.

The operation of the thrust load compensating system is illustrated in FIGS. 6 and 7. FIG. 6 is a graph of psi versus rotor speed in rpm with line A representing compressor diffuser discharge pressure and line B representing piston pressure. The difference between line A and B represents the pressure drop in the conduit between the compressor and piston.

Thrust load applied to the bilateral thrust bearing in pounds versus rotor speed in rpm is illustrated in the graph of FIG. 7. Line D represents thrust bearing load capacity while line E shows uncompensated bearing load. The force developed by the thrust load compensating system is shown by line F while line G illustrates the compensated load on the bilateral thrust bearing. As is amply demonstrated by the distance between lines E and G, the load on the thrust bearing is drastically reduced by the thrust load compensating system over the entire range of operating speeds for the permanent magnet turbogenerator.

The thrust load compensating system does not reduce the thrust loads generated aerodynamically by the compressor and turbine and applied to the bilateral thrust bearing but rather compensates for the unequally generated load with the addition of a piston pressure at the end of the turbogenerator shaft. This is particularly significant since thrust bearing load capacity increases with speed only slightly at higher speeds while the wheel generated aerodynamic thrust load goes up as speed squared. The compliant foil hydrodynamic fluid film journal bearing 19 at the free end of the permanent magnet generator shaft 16 serves as a non-rotating non-contacting piston ring seal, and together with the fixed end cap 46 forms a pressure chamber for the free end of the permanent magnet generator shaft 16 which can then serve as a movable thrust piston.

While specific embodiments of the invention have been illustrated and described, it is to be understood that these are provided by way of example only and that the invention is not to be construed as being limited thereto but only by the proper scope of the following claims.

What we claim is:

1. A thrust load compensating system for a turbomachine, comprising:

a power head having a compressor and a turbine with the compressor having a compressor wheel and a compressor diffuser and the turbine having a turbine wheel, the compressor wheel and the turbine wheel disposed on a common shaft rotatably supported by a compliant foil hydrodynamic fluid film journal bearing and a bilateral compliant foil hydrodynamic fluid film thrust bearing;

a rotary machine with a shaft having one end coupled to the compressor end of said power head common shaft and a free end rotatably supported by a compliant foil hydrodynamic fluid film journal bearing;

a fixed end cap mounted over the free end of said rotary machine shaft; and a separate tubular conduit extending directly from said compressor to the interior of said fixed end cap to provide compressor bleed air having a gauge pressure that varies approximately with the square of turbomachine speed directly to the free end of said rotary machine shaft.

2. The thrust load compensating system of claim 1 wherein said compressor includes a compressor plenum, and said compressor bleed air is taken from the compressor plenum.

3. The thrust load compensating system of claim 1 wherein said compressor includes a compressor scroll, and said compressor bleed air is taken from the compressor scroll slightly below the tip of said compressor wheel.

4. The thrust load compensating system of claim 1 wherein said compressor includes a compressor scroll and a diffuser channel, and said compressor bleed air is taken from the diffuser channel near the transition from the compressor scroll.

5. The thrust load compensating system of claim 1 wherein said compressor includes a diffuser channel, and said compressor bleed air is taken from near the mid-point of said diffuser channel.

6. The thrust load compensating system of claim 1 wherein said compressor bleed air is taken from the transition zone after the compressed air leaves the compressor wheel and before it enter said diffuser.

7. The thrust load compensating system of claim 1 wherein said diffuser is parallel walled.

8. The thrust load compensating system of claim 1 wherein said fixed end cap mounted over the free end of said rotary machine shaft serves as the end of a non-rotating thrust cylinder.

9. The thrust load compensating system of claim 1 wherein the free end of said rotary machine shaft serves as a movable thrust piston.

10. The thrust load compensating system of claim 9 wherein the compliant foil hydrodynamic fluid film journal bearing rotatably supporting the free end of said rotary machine shaft function as the walls of the pressure cylinder surrounding said movable thrust piston and as a non-rotating non-contacting piston ring seal.

11. The thrust load compensating system of claim 9 wherein said fixed end cap mounted over the free end of said rotary machine shaft and the compliant foil hydrodynamic fluid film journal bearing rotatably supporting the free end of said rotary machine shaft together form a pressure chamber for the free end of said rotary machine shaft movable thrust piston.

12. The thrust load compensating system of claim 11 wherein the axial forces applied to said movable thrust piston are approximately equal to gauge pressure in the pressure chamber times the cross-sectional area of the movable thrust piston.

13. The thrust load compensating system of claim 12 and in addition means to control the ratio of the axial forces applied to said movable piston to the square of turbomachine speed.

14. The thrust load compensating system of claim 13 wherein said means to control the ratio of the axial forces applied to said movable piston to the square of turbomachine speed is an orifice approximately the size of said conduit extending from said compressor to the interior of said fixed end cap.

15. The thrust load compensating system of claim 13 wherein said means to control the ratio of the axial forces applied to said movable piston to the square of turbomachine speed is an automatic tracking valve to set gauge pressure in said pressure chamber at a fixed ratio to compressor discharge pressure.

16. The thrust load compensating system of claim 11 wherein said compressor and turbine on a common shaft generate a net aerodynamic thrust force on said bilateral compliant foil hydrodynamic fluid film thrust bearing and wherein the axial force generated by the pressure chamber and applied to said movable thrust piston is slightly less that said net aerodynamic thrust force on said bilateral compliant foil hydrodynamic fluid film thrust bearing and in the opposite direction.

17. A thrust load compensating system for a turbomachine, comprising:

a power head having a compressor and turbine on a common shaft rotatably supported by a compliant foil hydrodynamic fluid film journal bearing and a bilateral compliant foil hydrodynamic fluid film thrust bearing;

a permanent magnet generator with a permanent magnet generator shaft having one end coupled to the compressor end of said power head common shaft and a free end rotatably supported by a compliant foil hydrodynamic fluid film journal bearing, said permanent magnet generator also including a stator having internal cooling fins with said stator disposed around said permanent magnet generator shaft;

a fixed end cap mounted over the free end of said permanent magnet generator shaft; and a separate tubular conduit extending directly from said compressor to the interior of said fixed end cap to provide compressor bleed air having a gauge pressure that varies approximately with the square of turbomachine speed, directly to the free end of said permanent magnet generator shaft to thrust bias said permanent magnet generator shaft towards said power head.

18. The thrust load compensating system of claim 17 wherein said compressor includes a compressor wheel and plenum, and said compressor bleed air is taken from the compressor plenum.

19. The thrust load compensating system of claim 17 wherein said compressor includes a compressor wheel and scroll, and said compressor bleed air is taken from the compressor scroll slightly below the tip of said compressor wheel.

20. The thrust load compensating system of claim 17 wherein said compressor includes a compressor wheel, a scroll and a diffuser channel, and said compressor bleed air is taken from the diffuser channel near the transition from the compressor scroll.

21. The thrust load compensating system of claim 17 wherein said compressor includes a compressor wheel and a diffuser channel, and said compressor bleed air is taken from near the mid-point of said diffuser channel.

22. The thrust load compensating system of claim 17 wherein said compressor includes a compressor wheel and a diffuser, and said compressor bleed air is taken from the transition zone after the compressed air leaves the compressor wheel and before it enter said diffuser.

23. The thrust load compensating system of claim 22 wherein said diffuser is a parallel walled diffuser.

24. The thrust load compensating system of claim 17 wherein said separate tubular conduit extends around the exterior of said permanent magnet generator.

25. The thrust load compensating system of claim 17 wherein said separate tubular conduit extends through the internal cooling fins which cool said permanent magnet stator.

26. The thrust load compensating system of claim 17 wherein the free end of said permanent magnet generator shaft serves as a movable thrust piston.

27. The thrust load compensating system of claim 17 wherein said fixed end cap mounted over the free end of said permanent magnet generator shaft serves as the end of a non-rotating thrust cylinder.

28. The thrust load compensating system of claim 26 wherein the compliant foil hydrodynamic fluid film journal bearing rotatably supporting the free end of said permanent magnet generator shaft function as the walls of the pressure cylinder surrounding said movable thrust piston.

29. The thrust load compensating system of claim 26 wherein said fixed end cap mounted over the free end of said permanent magnet generator shaft and the compliant foil hydrodynamic fluid film journal bearing rotatably supporting the free end of said permanent magnet generator shaft together form a pressure chamber for the free end of said permanent magnet generator shaft movable thrust piston.

30. The thrust load compensating system of claim 29 wherein the axial forces applied to said movable thrust piston are approximately equal to gauge pressure in the pressure chamber times the cross-sectional area of the movable thrust piston.

31. The thrust load compensating system of claim 29 and in addition means to control the ratio of the axial forces applied to said movable piston to the square of turbomachine speed.

32. The thrust load compensating system of claim 31 wherein said means to control the ratio of the axial forces applied to said movable piston to the square of turbomachine speed is an orifice disposed within said conduit extending from said compressor to the interior of said fixed end cap.

33. The thrust load compensating system of claim 31 wherein said means to control the ratio of the axial forces applied to said movable piston to the square of turbomachine speed is an automatic tracking valve to set gauge pressure in said pressure chamber at a fixed ratio to compressor discharge pressure.

34. The thrust load compensating system of claim 29 wherein said compressor and turbine on a common shaft generate a net aerodynamic thrust force on said bilateral compliant foil hydrodynamic fluid film thrust bearing and wherein the axial force generated by the pressure chamber and applied to said movable thrust piston is slightly less that said net aerodynamic thrust force on said bilateral compliant foil hydrodynamic fluid film thrust bearing and in the opposite direction.

35. A thrust load compensating system for a turbomachine, comprising:

a power head having a compressor and turbine on a common shaft rotatably supported by a compliant foil hydrodynamic fluid film journal bearing and a bilateral compliant foil hydrodynamic fluid film thrust bearing;

a permanent magnet generator with a permanent magnet shaft having one end coupled to the compressor end of said power head common shaft and a free end rotatably supported by a compliant foil hydrodynamic fluid film journal bearing, said permanent magnet generator also including a stator having internal cooling fins with said stator disposed around said permanent magnet generator shaft;

a fixed end cap mounted over the free end of said permanent magnet generator shaft; and a separate tubular conduit extending directly from said compressor to the interior of said fixed end cap to provide compressor bleed air having a gauge pressure that varies approximately with the square of turbomachine speed, directly to the free end of said permanent magnet generator shaft to thrust bias said permanent magnet generator shaft towards said power head;

the free end of said permanent magnet generator shaft serves as a movable thrust piston, said fixed end cap mounted over the free end of said permanent magnet generator machine shaft serves as a non-rotating thrust cylinder cap, and the compliant foil hydrodynamic fluid film journal bearing rotatably supporting the free end of said permanent magnet generator shaft serves as a non-rotating contacting piston ring seal to together form a pressure chamber with the movable thrust piston.

36. The thrust load compensating system of claim 35 wherein said compressor and turbine on a common shaft generate a net aerodynamic thrust force on said bilateral compliant foil hydrodynamic fluid film thrust bearing and wherein the axial force generated by the pressure chamber and applied to said movable thrust piston is slightly less that said net aerodynamic thrust force on said bilateral compliant foil hydrodynamic fluid film thrust bearing and in the opposite direction.

37. A thrust load compensating system for a turbomachine, comprising:

a power head having a compressor and a turbine on a common shaft rotatably supported by a compliant foil hydrodynamic fluid film journal bearing and a bilateral compliant foil hydrodynamic fluid film thrust bearing, said compressor including a compressor wheel and plenum;

a rotary machine with a shaft having one end coupled to the compressor end of said power head common shaft and a free end rotatably supported by a compliant foil hydrodynamic fluid film journal bearing;

a fixed end cap mounted over the free end of said rotary machine shaft; and a separate tubular conduit extending directly from said compressor to the interior of said fixed end cap to provide compressor bleed air from said compressor plenum, having a gauge pressure that varies approximately with the square of turbomachine speed, directly to the free end of said rotary machine shaft, said fixed end cap mounted over the free end of said rotary machine shaft serves as the end of a non-rotating thrust cylinder, the free end of said rotary machine shaft serves as a movable thrust piston, the compliant foil hydrodynamic fluid film journal bearing rotatably supporting the free end of said rotary machine shaft function as the walls of the pressure cylinder surrounding said movable thrust piston, said fixed end cap mounted over the free end of said rotary machine shaft and the compliant foil hydrodynamic fluid film journal bearing rotatably supporting the free end of said rotary machine shaft together form a pressure chamber for the free end of said rotary machine shaft movable thrust piston, and the compliant foil hydrodynamic fluid film journal bearing rotatably supporting the free end of said rotary machine shaft end of said rotary machine shaft serves as a non-contacting piston ring seal.

38. The thrust load compensating system of claim 1 wherein said separate tubular conduit has a substantially uniform flow area.

* * * * *

UNITED STATES PATENT AND TRADEMARK OFFICE
CERTIFICATE OF CORRECTION

PATENT NO. : 5,791,868
DATED : August 11, 1998
INVENTOR(S) : Robert W. Bosley et al.

It is certified that error appears in the above-indentified patent and that said Letters Patent is hereby corrected as shown below:

Column 2, line 33, change "It" to --If--

Claim 1, line 18, after "air" insert --,--
Claim 1, line 20, after "speed" insert --,--
Claim 17, line 19, after "air" insert --,--
Claim 35, line 19, after "air" insert --,--

Signed and Sealed this

Seventeenth Day of November, 1998

Attest:

BRUCE LEHMAN

*Attesting Officer*  Commissioner of Patents and Trademarks